United States Patent [19]

Opocensky

[11] 3,987,685
[45] Oct. 26, 1976

[54] CURSOR POSITION DEVICE

[75] Inventor: Willard J. Opocensky, Los Angeles, Calif.

[73] Assignee: Xerox Corporation, Stamford, Conn.

[22] Filed: Dec. 16, 1974

[21] Appl. No.: 532,788

[52] U.S. Cl. .............................. 74/471 R; 74/198; 340/324 A
[51] Int. Cl.[2] .......................................... G05G 9/00
[58] Field of Search .......... 74/198, 471; 340/324 A; 178/18–20

[56] References Cited
UNITED STATES PATENTS

| 3,179,755 | 4/1965 | Burnham | 74/471 |
| 3,269,190 | 8/1966 | Laman | 74/198 |
| 3,395,589 | 8/1968 | Gersten | 74/471 |
| 3,541,521 | 11/1970 | Koster | 340/324 A |

Primary Examiner—Samuel Scott
Assistant Examiner—Randall Heald
Attorney, Agent, or Firm—J. E. Beck; T. J. Anderson; L. Zalman

[57] ABSTRACT

The invention relates to a position device which rides over a surface for controlling a cursor over a visual display. The device generates signals indicative of its position to cause the cursor to be displayed on the display at a corresponding position. The device includes a control mechanism that comprises a transport sphere coupled with rotatable shafts which represent the position of the device in terms of Cartesian coordinates. The sphere is in contact with the surface over which the device rides and the rotatable shafts contact the sphere at a position on the sphere approximately 90° from the contact loci of the sphere and the surface.

5 Claims, 7 Drawing Figures

CURSOR POSITION DEVICE

BACKGROUND OF THE INVENTION

This invention relates to display systems and, more particularly, to devices which alter the display at selected locations by controlling a cursor over the display.

Engelbart, in U.S. Pat. No. 3,541,541 describes an X-Y position indicator control for movement by the hand over any surface to move a cursor over the display on a cathode ray tube. The indicator control mechanism of the Engelbart device contains X and Y position wheels mounted perpendicular to each other, which rotate according to the X and Y movements of the mechanism, and which operate rheostats to send signals along a wire to a computer which controls a CRT display.

The Engelbart device is a promising one for altering a display pattern on a cathode ray tube. The use of the cursor allows the operator to accurately indicate the exact position on the display on which he can make alterations. The X-Y position indicating device is a practicable mechanism for controlling the position of the cursor relative to the display pattern.

A disadvantage of the Engelbart device is that its movement over a surface is dependent upon the movement of the X-Y position wheels themselves. Hence, the device is biased to move in X and Y directions respective to the planes of the X and Y position wheels.

Rider, in U.S. Pat. No. 3,835,464, provides an X-Y position indicator for controlling a cursor over a visual display which is not biased in any given direction of movement. The position indicator includes a transport sphere in combination with position wheels for supporting the indicator and translating its movement into Cartesian coordinates.

OBJECTS OF THE INVENTION

It is an object of the present invention to provide another position device of the type which has as a transport and control element a sphere for removing biases in any given direction of movement.

It is a further object of the present invention to provide a position device for controlling a cursor over a visual display which includes a control mechanism that has as its transport means a sphere capable of rotation in any given direction.

It is yet another object of the present invention to provide a position device which may ride over any surface for controlling a cursor over a visual display.

It is still another object of the present invention to provide a position device for controlling a cursor over a visual display which has a control mechanism that comprises a transport sphere in combination with rotatable shafts ensuring no preferred direction of movement.

Other objects of the present invention will be evident from the description hereinafter presented.

SUMMARY OF THE INVENTION

The invention provides a position device for controlling a cursor over a display on a cathode ray tube. The device generates signals indicative of its position to cause the cursor to be displayed on the CRT at a corresponding position.

Another feature of the invention is that the position device rides over a surface about a transport sphere. The movement of the transport sphere causes signals to be generated from the device indicative of its position.

Yet another feature of the present invention is that the control mechanism further includes rotatable shafts in combination with the transport sphere such that the shafts contact this sphere at positions on the sphere 90° from the contact locii of the sphere and the supporting surface. The movement of the device over the surface is translated into the movement of the sphere in rotation about its radius. The radial rotation of the sphere is in turn translated into Cartesian coordinates respective to the resulting rotation of the shafts.

An additional feature of the present invention is that the shafts contact the sphere at points on the sphere approximately 90° from each other.

It is still another feature of the invention that the position wheels are coupled to indicating means which transmit X and Y signals which control the display in accordance with the respective movements of the shafts.

It is yet another feature of the invention that a roller be spring loaded to contact the sphere at a third point to constrain the sphere in contact with the rotatable shafts. The third point of contact is preferably at a position on the sphere 90° from the contact locii of the sphere and its supporting surface, opposite from the positions of shaft contact with the sphere, and approximately equidistant therefrom.

Another feature of the present invention is that the sphere is also constrained in an upward direction from its supporting surface by means of another roller spring biased in contact with the sphere opposite from the supporting surface. This point of contact is at a position off-set from a polar position defined on the surface of the sphere by an axis through the center of the sphere and its point of contact with its supporting surface.

These and other features which are considered to be characteristic of this invention are set forth with particularity in the appended claims. The invention itself, however, as well as additional objects and advantages thereof, will best be understood from the following description when considered in conjunction with the accompanying drawings.

DESCRIPTION OF THE PREFERRED EMBODIMENT

Figure 1:
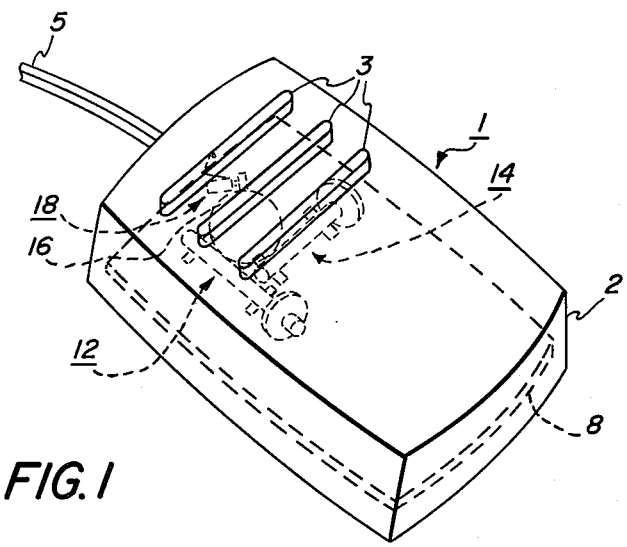
FIG. 1 is a top perspective view of a position device of the present invention.

In FIG. 1 is shown a position device 1 which incorporates features of the invention. Located in the top of the housing 2 of the device 1 are control buttons 3 which are provided for closing switches (not shown) which send pulses through a cable 5 to signal certain changes in the displayed information on a display monitor (not shown). A horizontal support plane 8 is mounted in fixed relation to the inside of the housing 2 to support transducer elements 12 and 14. A sphere 16 is located within the position device 1 bounded by the transducer elements 12 and 14. The sphere 16 is constrained against these elements by means of a biasing element 18.

Figure 2:
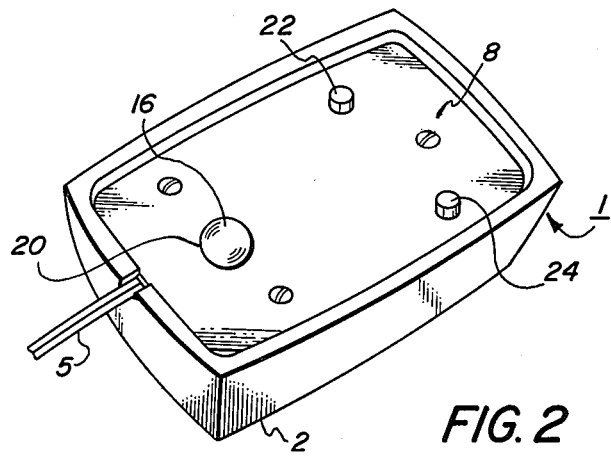
FIG. 2 is a bottom perspective view of the position device of FIG. 1.
Figure 3:
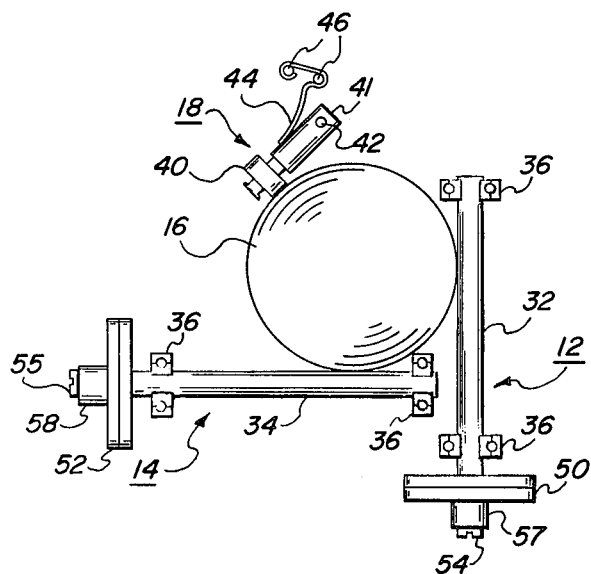
FIG. 3 is a bottom view of the transport sphere shown in FIGS. 1 and 2 as constrained by the rotatable elements in contact with it.

As shown in FIG. 2, the sphere 16 protrudes through an aperture 20 to extend beyond the bottom surface of the support plane 8. Support stems 22 and 24 are mounted on the bottom side of the plane 8 which in combination with a sphere 16 enable the position device 1 to be supported on a surface, such as a table, in a tripodal configuration. The radius of the sphere 16 and the length of the stems 22 and 24 are selected such that the position device 1 is in horizontal relationship with a horizontal supporting surface. As the indicator device 1 is moved by the supporting surface, the sphere 16 translates the $x$ and $y$ coordinate directions of travel of the device 1 over the surface into radial motion. The diameter of the aperture 20 is smaller than the diameter of the sphere 16 such that the sphere 16 is retained within the device 1.

a bottom view of the transducer elements 12 and 14 and the biasing element 18 are shown in FIG. 3 in contact with the sphere 16. The transducer elements 12 and 14 are comprised respectively of rotatable shafts 32 and 34 which are rotatably supported on the support plane 8 by means of bearing elements 36. The rotatable shafts 32 and 34 contact the sphere 16 at points located approximately 90° from the contact loci of the sphere 16 and the supporting surfaces. This latter feature is more clearly shown in the front view, FIG. 4, of the arrangement shown in FIG. 3.

Additionally, the rotatable shafts 32 and 34 contact the sphere 16 at points on the sphere approximately 90° from each other. To maintain the desired physical relationships between the shafts 32 and 34 and the sphere 16, the shafts 32 and 34 mounted at right angles to each other and located substantially parallel to the supporting surface over which the device 1 is to be transported.

The biasing element 18 constrains the sphere against the shafts 32 and 34 to ensure that the radial rotation of the sphere 16 is translated into Cartesian coordinates of motion respective to the resulting rotation of the shafts 32 and 34. The biasing element 18 is comprised of a wheel bearing 40 which is mounted on an axle 41 which pivots about a stem 42 mounted on the support plane 8. The bearing 40 is biased against the sphere 16 by means of a spring 44 which is anchored to stems 46 to direct pressure on the axle 41 in the direction of the sphere 16. The wheel bearing 40 is rotatably mounted on the axle 41 so that there is no interference with the rotation of the sphere 16. The contact of the bearing 40 with the sphere 16 is at a position on the sphere 16 90° from the contact loci of the sphere 16 and its supporting surface, opposite from the position of shaft contact with the sphere 16, and approximately equal distance therefrom. The axle 41 is disposed to pivot through the plane of the shafts 32 and 34 to maintain the contact surface of the bearing 40 tangential to the surface of the sphere 16.

Encoder disks 50 and 52 are fixed respectively on ends of the shafts 32 and 34 by means of screws 54 and 55 and sleeves 57 and 58. The encoder disks 50 and 52 are such as described in U.S. Pat. No. 3,541,541 to convert the rotation of the shafts 32 and 34 to $x$ and $y$ electrical signals.

Figure 4:
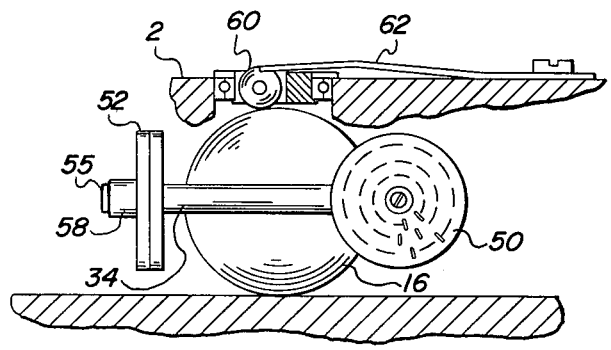
FIG. 4 is a front perspective view of the rotatable shafts shown in FIG. 3 in contact with the sphere riding over a support surface with an additional constraint imposed on the upper surface of the sphere.

As shown in FIG. 4, the sphere 16 is constrained in the direction opposite the supporting surface by means of a roller 60 which is spring biased by a spring 62 to contact the sphere 16 at a position off-set from a polar position defined on the surface of the sphere 16 by an axis through the center of the sphere 16 and its point of contact with its supporting surface. The roller 60 and the spring 62 are mounted relative to each other and to a section of the housing 2 as shown in FIG. 5.

Figure 5A:
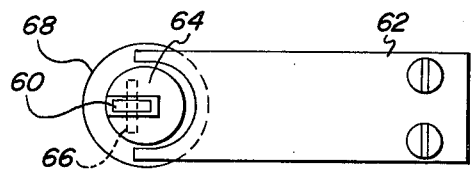
FIG. 5(a) is a top view of the assembly showing roller and spring.
Figure 5B:
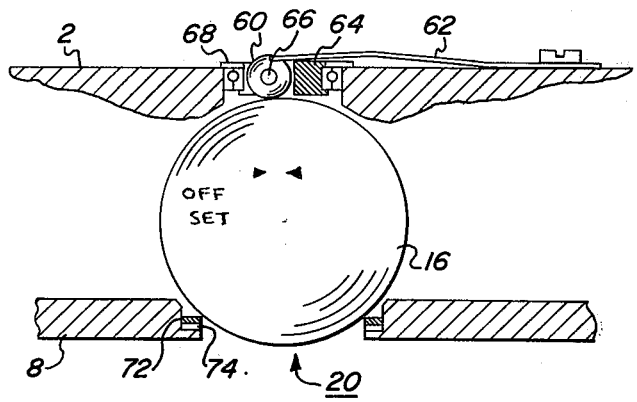
In FIG. 5(b) is shown the upper and lower constraining elements imposed on the sphere by the position device of FIG. 1.
Figure 5C:
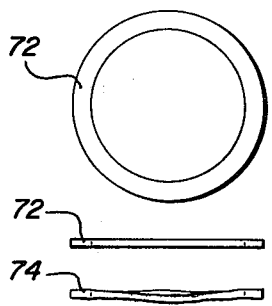
FIG. 5(c) is a view of the washers.

In FIG. 5($a$), a top view of the assembly consisting of the roller 60 and the spring 62 is shown. The roller 60 is mounted within a recess in a retainer 64 by means of a shaft 66. The retainer 64 is mounted within the inner race of a bearing 68 which in turn is disposed in a section of the housing 2 above the upper surface of the sphere 16 as shown in FIG. 5($b$) to provide the desired off-set. The spring 16 is, in fact, biased in contact against the upper surface of the bearing 68, which in turn biases the roller 60 against the surface of the sphere 16. The spring 16 is a leaf spring which provides sufficient force to retain the bearing 68 within the channel provided in the fixed section of housing 2 and yet allow the bearing 68 to move sufficiently in the vertical direction to avoid damaging shock from the movement of the sphere 16 to be imparted to the roller 60.

The off-set of the roller 60 from the polar position on the sphere 16 prevents any skidding of the sphere 16 which would otherwise result. Such an off-set of the roller 60 mounted within the bearing 68 provides a caster-like movement of the roller 60 as the sphere 16 rotates. The constraint thus provided in the vertical direction for the sphere 16 allows for smooth action and rotation of the sphere 16 for the optimum conversion of directional information through to the rotational shafts 32 and 34.

About the periphery of the aperture 20 of the support plane 8 is located a washer 72 which is biased against the surface of the sphere 16 by means of a wave-spring washer 74 disposed within a recess in the support plane 8. The washer 72 therefore serves to provide a seal between the plane 8 and the sphere 16 to keep dirt from entering the device 1 in that dirt is removed from the sphere 16 as it rotates. The action of the wave-spring washer 74 also serves to provide a cushion for the sphere 16 to protect the sphere 16 from any excessive pressures, such as from the device 1 being dropped. In FIG. 5($c$), the washer 72 and 74 are shown.

Obviously, many modifications of the present invention are possible in light of the above teaching. It is therefore to be understood that, in the scope of the appended claims, the invention may be practiced other than as specifically described.

What is claimed is:
1. Apparatus for indicating movement over a surface comprising:
   a housing having an apertured base member,
   a sphere loosely supported by said housing such that said sphere can have universal rotation and such that a portion of said sphere extends through said aperture in said base member, contact between said sphere and the surface providing rotation of said sphere indicative of movement of said housing with respect to the surface, a pair of rotatable members each supported by said housing, each of said rotatable members being adapted to rotate about a longitudinal axis thereof, the axes of rotation of said rotatable members being substantially perpendicular to each other, each of said rotatable members being in frictional abutment with said sphere such that each of said rotatable members rotates as a function of a component of the rotation of said sphere, transducer means responsive to rotation of each of said rotatable members for delivering signals indicative of the movement and position of said housing, and rotatable means for urging said sphere toward said base member, said rotatable means contacting said sphere at a position off-set from a polar position on the surface of said sphere defined by an axis through the center of said sphere and the point of contact of said sphere with the surface.

2. The apparatus of claim 1 wherein a non-planar member surrounds said aperture in said base member to provide a seal between said base member and the portion of said sphere extending through said aperture in said base member.

3. Position indicator apparatus for a display monitor whereby the display is alterable in accordance with signals delivered which indicate positions on said display and changes to be made therein, said apparatus being movable over a surface to provide position indications corresponding to positions on said display, comprising:

a housing having an apertured base member, a sphere loosely supported by said housing such that said sphere can have universal rotation and such that a portion of said sphere extends through said aperture in said base member, contact between said sphere and the surface providing for rotation of said sphere indicative of movement of said housing with respect to the surface, a pair of rotatable members each supported by said housing, each of said members being adapted to rotate about a longitudinal axis thereof, the axis of rotation of said rotatable members being substantially perpendicular to each other, each of said rotatable members being in frictional abutment with said sphere such that each of said rotatable members rotates as a function of a component of the rotation of said sphere, transducer means responsive to rotation of each of said rotatable members for delivering signals to said monitor indicative of the movement and position of said housing, and rotatable means for urging said sphere toward said base member, said rotatable means contacting said sphere at a position off-set from a polar position on the surface of said sphere defined by an axis through the center of said sphere and the point of contact of said sphere with the surface.

4. The position indicator apparatus of claim 3 wherein a non-planar member surrounds said aperture in said base member to provide a seal between said base member and the portion of said sphere extending through said aperture in said base member.

5. Apparatus for indicating movement over a surface comprising:

a housing having an apertured base member, a sphere loosely supported by said housing such that said sphere can have universal rotation and such that a portion of said sphere extends through said aperture in said base member, contact between said sphere and the surface providing rotation of said sphere indicative of movement of said housing with respect to the surface, a pair of rotatable members each supported by said housing, each of said rotatable members being adapted to rotate about a longitudinal axis thereof, the axes of rotation of said rotatable members being substantially perpendicular to each other, each of said rotatable members being in frictional abutment with said sphere such that each of said rotatable members rotates as a function of a component of the rotation of said sphere, transducer means responsive to rotation of each of said rotatable members for delivering signals indicative of the movement and position of said housing, rotatable means for urging said sphere toward said base member, said rotatable means contacting said sphere at a position off-set from a polar position on the surface of said sphere defined by an axis through the center of said sphere and the point of contact of said sphere with the surface, and a non-planar member surrounds said aperture in said base member to provide a seal between said base member and the portion of said sphere extending through said aperture in said base member.

* * * * *